Nov. 21, 1950  K. A. DOUTT  2,531,033
CONTROL MEANS

Filed June 24, 1949  3 Sheets-Sheet 1

INVENTOR.
KINGSLEY A. DOUTT
BY
Michael Williams
ATTORNEY

Patented Nov. 21, 1950

2,531,033

UNITED STATES PATENT OFFICE 2,531,033

CONTROL MEANS

Kingsley A. Doutt, Cortland, Ohio, assignor to Federal Machine and Welder Company, Warren, Ohio, a corporation of Ohio Application June 24, 1949, Serial No. 101,158

13 Claims. (Cl. 219—4)

My invention relates to control means, and more particularly to control means for electric resistance welding apparatus, and the principal object of this invention is to provide new and improved control means of this character.

The present application constitutes a continuation in part of an application filed by me on November 8, 1948, Serial Number 58,845, for Control Means.

The invention herein disclosed will be described for operation principally in connection with welding apparatus, although it will be appreciated that it is not limited to such application.

My invention makes it possible to change various functions of a machine quickly, reliably, and without the use of tools. Accordingly, with respect to a flash welder, it is possible to quickly, and reliably make a change in the amount of upset, position of current cut-off, amount of preheat, and final platen opening without the use of tools.

Further, through use of my invention, a change in adjustment to increase or decrease the amount of upset or flash will not necessarily change the relation of current cut-off to upset, or amount of preheat, or final platen opening. Also, a change in final platen opening will not affect any other adjustment, nor will an increase or decrease in the amount of preheat or change in position of current cut-off affect other adjustments.

In the drawings accompanying this specification, and forming a part of this application, there is shown, for purposes of illustration, an embodiment which my invention may assume, and in these drawings.

Figure 1:
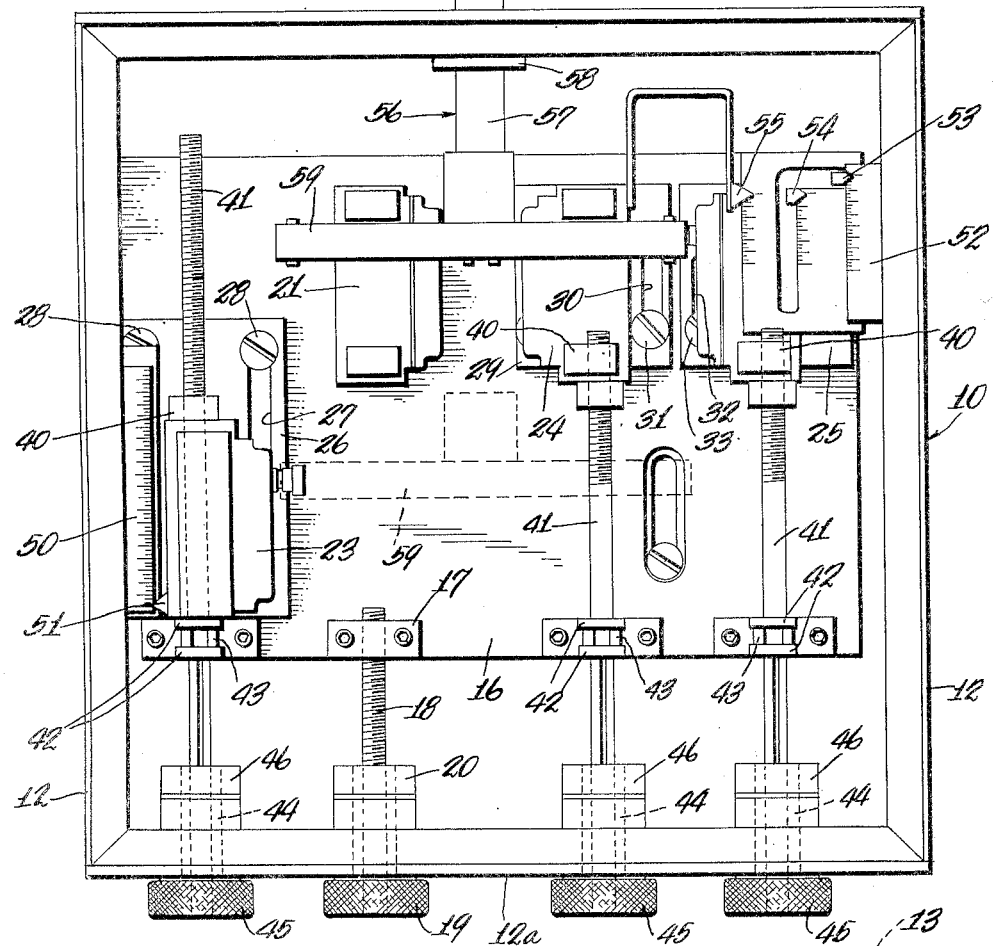
Figure 1 is a fragmentary plan view of a device disclosing controls used in the embodiment of my invention, the top of the device being omited.
Figure 2:
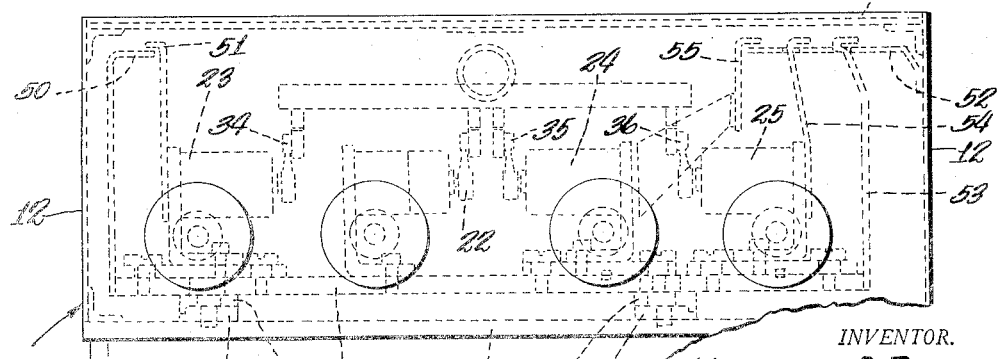
Figure 2 is a fragmentary end view of the device shown in Figure 1.

Referring particularly to Figures 1 and 2, the device 10 containing the controls comprises a sheet metal box having a bottom 11, sides and ends 12, and a removable top 13. The bottom 11 is formed with a pair of elongated runners 14 which respectively form slide bearings for pads 15 carried from the under surface of a base 16, so that the base is adjustable longitudinally along the runners 14.

At the forward end of the device 10 (lower end with reference to Figure 1), a lug 17 is bolted to the base, and this lug is threaded to receive a screw 18. A hand wheel 19 is secured to the screw 18 at a portion exteriorly of the front wall 12a of the device 10, and a collar 20 is secured to the screw 18 interiorly of the front wall 12a, so that rotation of the hand wheel 19 rotates the screw and causes the base 16 to be adjusted along the runners 14. Fixed to the base 16, and movable therewith, is a control, such as the electrical limit switch 21 herein shown. The limit switch may be of any well known construction, and preferably has a pivoted operating arm 22 which is spring pressed to a predetermined position, in this case in upright position.

Limit switches 23, 24 and 25, which may be similar to the limit switch 21, are also carried by the base 16, but each switch is preferably mounted for adjustment in the same general direction as the disposition of the runners 14. Accordingly, the switch 23 is carried by a plate 26 which is held to sliding action along the base 16 by means of elongated slots 27 which cooperate with headed screws 28 to confine sliding action of the plate 26. Likewise, the switch 24 is mounted on a plate 29 which has slots 30 and screws 31, and the switch 25 is mounted on a plate which has slots 32 and screws 33. Further, the switch 23 has an operating arm 34, the switch 24 has an operating arm 35, and the switch 25 has an operating arm 36, and all operating arms extend generally upright, as viewed in Figure 2.

Figure 4:
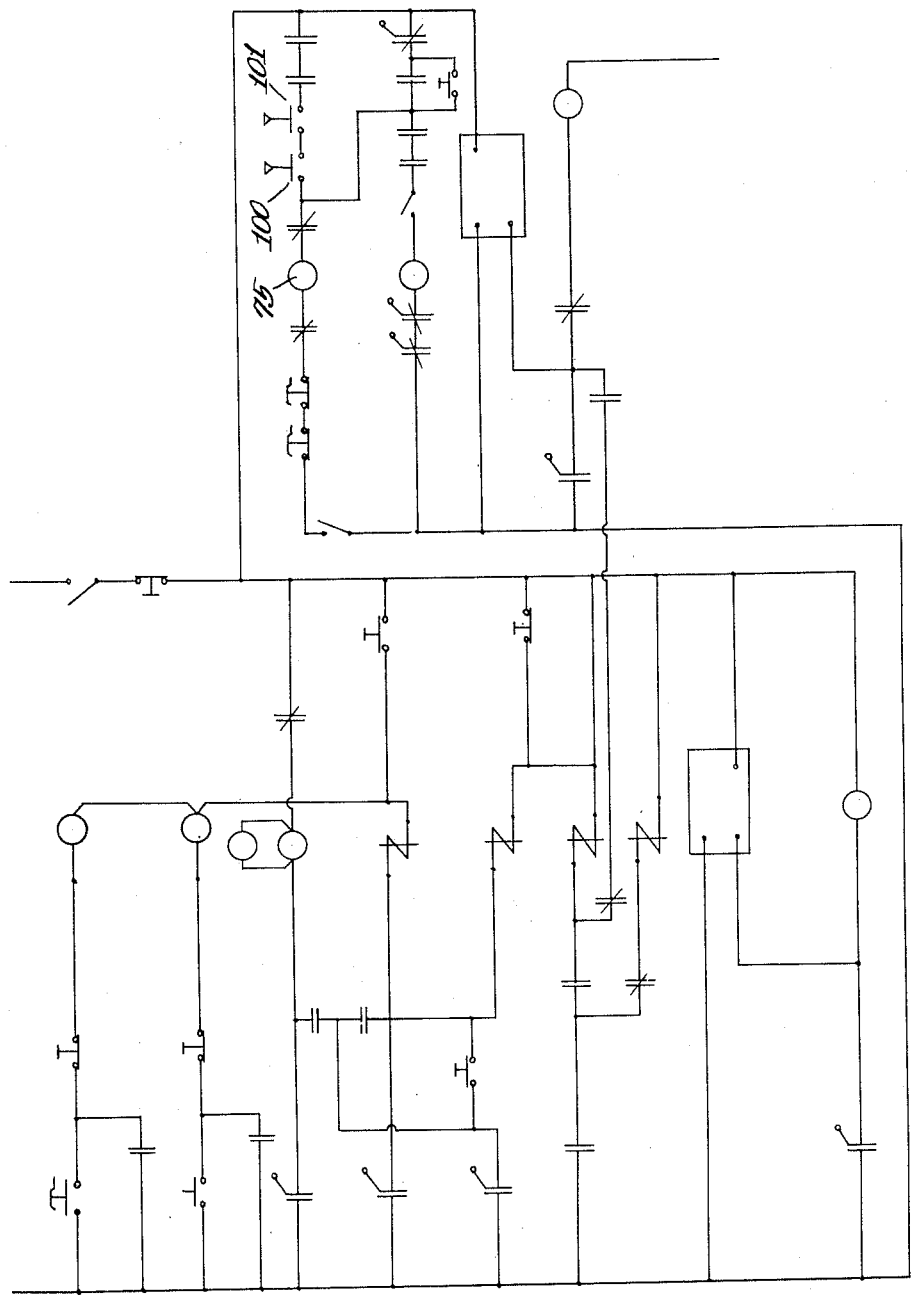
Figure 4 is an electrical wiring diagram which may be used in combination with the control means.

Means are provided to engage the operating arms 22, 34, 35 and 36 and to selectively trip these arms to effect control of various functions, such as of a machine. For example, the limit switches 23, 21, 24 and 25 may be adapted for disposition in an electrical circuit, such as for controlling a flash welder, as shown in Figure 4 and also in the co-pending application hereinbefore referred to, so as to respectively control rear stop, forward stop, upset and current cut-off of the welder.

For purposes of adjustment, the limit switch carries a nut 40 through which is threaded a screw 41. The screw carries a pair of spaced collars 42 which fit against opposite sides of a bearing 43 bolted to the base 16, the collars and bearing permitting rotation of the screw 41 but restraining it from moving longitudinally. The forward end of the screw is splined to a sleeve 44 formed as part of the hand wheel 45, a collar 46 being secured to the sleeve to prevent disassembly of the hand wheel with respect to the front wall 12a of the device 10. Thus, as the hand wheel 45 is rotated, the limit switch 23 will be adjusted along the base 16 in general alignment with the adjustment of the base. The limit switches 24 and 25 are shiftable by means similar to those provided for the shifting of the switch 23, and like reference numerals are used to designate similar parts.

For purpose of indicating adjustment, the base 16 carries a scale 50 which is cooperable with a pointer 51 carried by the switch 23. A scale 52 is cooperable with pointers 53, 54 and 55 respectively carried by the base 16, the switch 25 and the switch 24 to indicate adjustment of these parts.

From the foregoing, it will be appreciated that the entire base may be shifted along the runners 14, without shifting the relative positions of the switches 21, 23, 24 and 25. Further, any one of the switches 23, 24 and 25 may be independently shifted to alter its relative position with respect to the other switches.

In the particular embodiment disclosed, a T cam 56 is shown for the purpose of operating the switches, such cam comprising a shaft 57 slidably in a bearing 58 carried by the device 10 so as to be held to reciprocable movement generally in line with the adjustment of the switches and the base. A head 59 is connected to the shaft 57 to extend transversely of its line of movement sufficiently so that it spans the distance between the operating arms of the outermost limit switches 23 and 25, and thus is in position to engage any one of the operating arms 22, 34, 35 and 36.

In view of the relative disposition of the T-cam 56 and the limit switches, it will be apparent that if the base 16 is shifted toward the head 59 the time when the cam effects operation of the limit switches is decreased, and the reverse is true if the base is shifted away from the T-cam 56. Thus, when the T-cam 56 is made to move in accordance with a movable member of a machine, various functions of the machine may be accurately and adjustably controlled by the device 10. Further, if the shaft 57 were connected to move with the platen of a flash welder, the various functions of such welder may be controlled, and sequence may be readily adjusted to the requirements of the weld.

Figure 3:
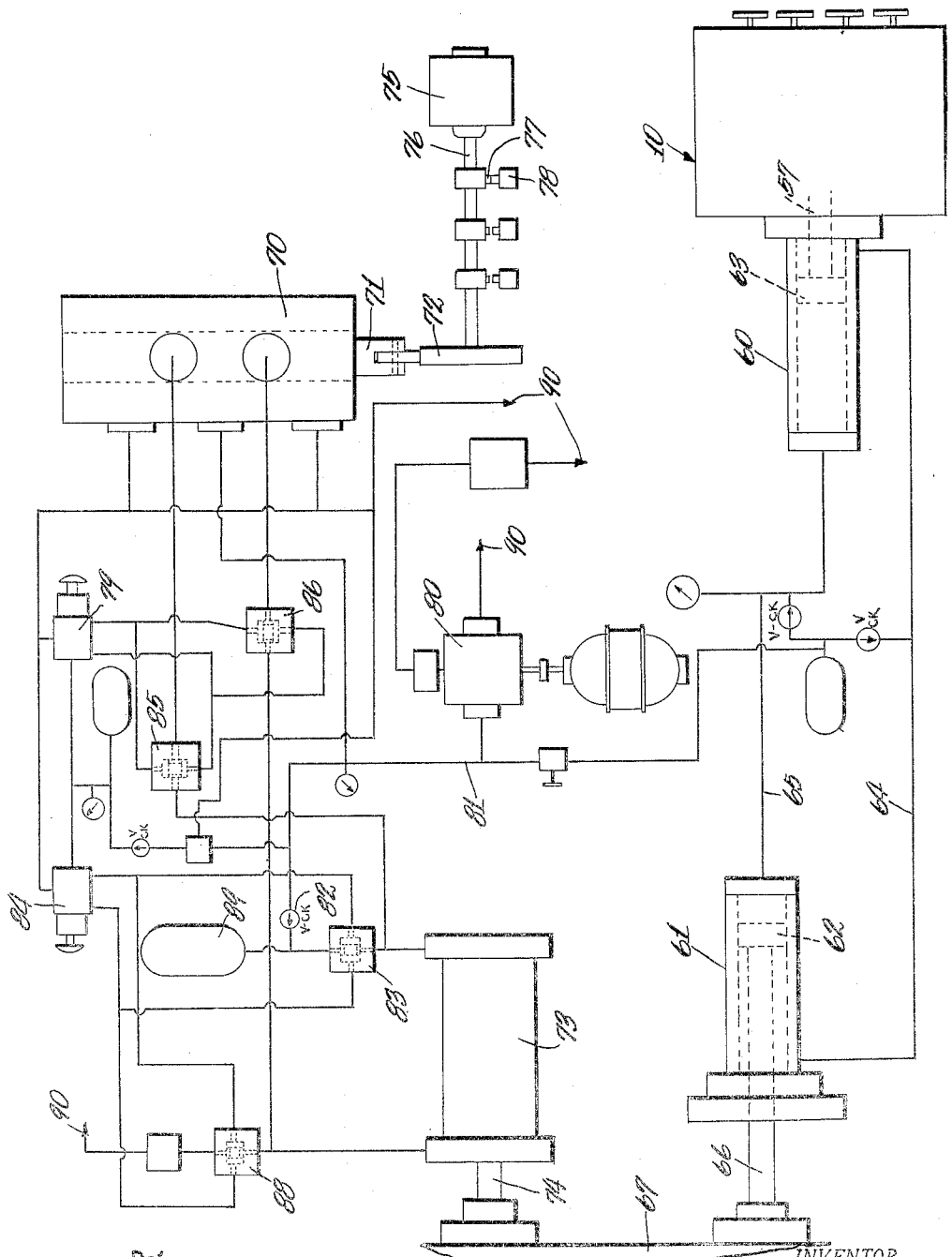
Figure 3 is a schematic view showing a circuit embodying my invention.

My invention further provides means whereby the device 10 may be positioned at a point remote from the machine, and referring particularly to Figure 3, the embodiment herein shown discloses motion transmission means in the form of fluid cylinders 60, 61 which are included in a fluid circuit so that when the piston 62 of the cylinder 61 moves it will induce like movement of the piston 63 in the cylinder 60, the fluid circuit being shown by the fluid lines 64, 65. Thus, the piston rod 66 of the piston 62 may be connected to the movable member of the machine, such as the platen 67 of a flash welder, and the device 10 may be disposed some distance from the machine. The piston rod of the piston 63 is connected to the shaft 57, or the shaft 57 may be this piston rod, so that the platen 67 and the T-cam 56 move in corresponding manner.

The hydraulic circuit and apparatus disclosed in Figure 3 is designed primarily for the control of a flash welder, and in certain respects produces the same result as the circuit and apparatus disclosed in my co-pending application hereinbefore referred to.

The valve schematically shown at 70 is substantially similar to the "flashing valve" described in my co-pending application, and since such valve is claimed in such application, it will be sufficient to here mention that as the valve member 71 is moved inwardly of the body of the valve 70 by the rotatable cam 72, or is moved outwardly by any desired means, such as a spring, opening and closing of valve ports are effected to control flow of fluid to the ports of a cylinder 73, which in this case operates the platen 67 by means of connection with the piston rod 74, the piston of which (not shown) is reciprocable within the cylinder.

In usual flash welder construction, the work to be welded is clamped in sets of dies, one set being stationary and the other set being carried by the platen 67 in position so that the two pieces of work are caused to approach each other for welding. Usually, pressure switches 100, 101 (see Figure 4) are included in the electrical circuit, so that when the dies clamp the work with proper pressure, the pressure switches close and initiate an electrical circuit through the starter of the sequence motor 75 to effect rotation of a cam shaft 76.

As the cam shaft 76 starts to revolve, the cam 77 falls off of the weld start limit switch 78 (to close this switch which was held open up to this point) and this switch is in electrical circuit with the contactor which controls flow of welding current and is also in electrical circuit with a solenoid valve 79. Revolution of the cam shaft 76 also causes movement of the cam 72 so as to push the valve member 71 inwardly of the valve body and open valve ports within this body. Fluid under pressure will be permitted to flow from the pump 80, through pressure line 81, past check valve 82, through open valve 83, to the rear end of cylinder 73, to urge the piston rod 74 outwardly of the piston and thus move the work carried by the platen toward the stationary supported work, whereby flashing occurs because of the welding current flowing between the two pieces of work.

It should be kept in mind that as the platen 67 moves, the T-cam 56, which has started from the position shown in dotted lines in Figure 1, moves accordingly. Flashing will continue until the head 59 engages and operates the operating arm of the upset limit switch 24. The electrical circuit is such that when the upset limit switch is operated, the solenoid valve 79 is deenergized and is moved to closed position and a solenoid valve 84 is energized and opened. When solenoid valve 79 is deenergized and closed, valves 85 and 86 are closed, blocking flow of fluid under pressure from the valve 70. When solenoid valve 84 is energized, valves 83 and 88 are opened, thereby dumping fluid from a pressure accumulator 89 into the blank end of the cylinder 73 through valve 83, and dumping fluid from the rod end of the cylinder 73 to a reservoir (indicated by arrows 90) through valve 88. The accumulator 89 carries fluid at a higher pressure than is delivered by the valve 70, so that upsetting of the weld is effected promptly and efficiently.

A predetermined time after upsetting of the weld starts, the head 59 of the T-cam 56 engages and operates the operating arm of the current cut-off limit switch 25, and this switch is in an electrical circuit so as to cause the contactor to interrupt flow of welding current to the machine. The operating arm of the forward stop limit switch 21 is next engaged and operated by the head 59 of the T-cam 56, and operation of this switch causes deenergization of the solenoid valve 84 which action closes valves 83 and 88, and since valves 85 and 86 are also closed, fluid is trapped in the rod end and the blank end of cylinder 73, and the piston in this cylinder is firmly held against movement.

After the forward stop switch 21 has been engaged and operated, means are energized to unclamp the now welded work, and also to energize solenoid valve 79 which in turn causes opening of valves 85 and 86, causing the platen 74 to return. The platen will continue in its returning movement until the head 59 of the T-cam 56 engages and operates the rear stop limit switch 23, and this switch is in electrical circuit with the solenoid valve 79 and energizes this valve, such action causing closing of the valves 85 and 86 and again flow of fluid to and from the upset cylinder 73 is blocked so that the platen is firmly held in retracted position. Means are provided to deenergize the sequence motor 75, and the welding machine is ready for another welding cycle. All of the limit switches are of the self-resetting type, so the control device 10 is ready for operation.

From the foregoing, it will be apparent that by adjustment of the base 16, the distance between the dies after welding is completed and before the platen is returned may be carefully regulated, without affecting any of the other adjustments. Further, the distance between the dies when the platen is fully returned may be easily regulated by adjustment of the rear stop limit switch 23 relative to the base 16. Adjustment of upset and current cut-off may be easily regulated by respectively adjusting switches 24 and 25 relative to the base 16.

Since all of the welding functions depend upon the physical metallurgical characteristics of the work to be welded, it will be appreciated that a welding machine operated by my improved control means may be quickly and easily adjusted for any desired purpose. This provides an extremely flexible welding machine and fulfills a long needed want, especially in the welding industry, since welding apparatus is expensive and it is desirable to have a machine that may be used for welding a multitude of shapes, cross-sections, and metallurgical characteristics without expensive changeover and modification.

In view of the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Means for controlling various functions of a machine having a movable member, comprising: a plurality of controls for controlling said functions, and means movable in accordance with the movement of said movable member, and adapted to selectively engage and operate said controls, all of said controls as a unit and said movable means having relative adjustment to vary the point of interengagement between said movable means and said controls as a unit, and said controls being adjustable relative to each other to vary the sequence of engagement with said movable means.

2. Means for controlling various functions of a machine having a movable member, comprising: a base adjustable with respect to said movable member; a plurality of controls, each for controlling one of said functions, at least certain of said controls being adjustably mounted on said base; and means movable in accordance with the movement of said movable member, and adapted to engage and operate said controls; adjustment of said base effecting adjustment of said controls as a unit with respect to said movable means, and adjustment of said controls with respect to said base providing for variation of the sequence of engagement between said controls and said movable means.

3. Means for controlling operation of a machine having a movable member, comprising: control means for controlling operation of said machine; first fluid cylinder means cooperable with said movable member and second fluid cylinder means cooperable with said control means, said first and second fluid cylinder means being connected in fluid circuit, and each comprising relatively movable parts, one part of said first fluid cylinder means being fixed and the other part being movable in accordance with said movable member, and one part of said second fluid cylinder means being fixed and the other part being movable through action of the fluid in said fluid circuit in accordance with the movement of said movable member and being adapted to operate said control means, whereby said control means may be disposed at a point remote from said machine.

4. Means for controlling operation of a machine having a movable member, comprising: control means for controlling operation of said machine; a first fluid cylinder fixed with respect to said machine and having its piston movable with said movable member, and a second fluid cylinder fixed with respect to said control means and having its piston movable relative to said control means and including means engageable therewith to effect operation of said control means, said first and second cylinders being in a fluid circuit so that the pistons of both fluid cylinders are movable in accordance with each other, whereby said control means may be disposed at a point remote from said machine.

5. Means for controlling various functions of a machine having a movable member, comprising: a plurality of controls for controlling said functions; a first fluid cylinder fixed with respect to said machine and having its piston movable with said movable member, and a second fluid cylinder fixed with respect to said control means and including means to selectively engage and operate said controls, said first and second cylinders being in a fluid circuit so that the pistons in both fluid cylinders are movable in accordance with each other, whereby said control means may be disposed at a point remote from said machine.

6. Means for controlling various functions of a machine having a movable member, comprising: a plurality of controls for controlling said functions; a first fluid cylinder fixed with respect to said movable member and having its piston movable with said movable member, and a second fluid cylinder fixed with respect to said control means and including actuating means to selectively operate said controls, said first and second cylinders being connected in a fluid circuit so that the pistons in both fluid cylinders are movable in accordance with each other, whereby said control means may be disposed at a point remote from said machine; and said control and said actuating means being relatively adjustable to vary interengagement.

7. Means for controlling various functions of a machine having a movable member, comprising: an adjustably mounted base; a plurality of electrical limit switches adapted to be placed in circuit with means for controlling said functions, at least certain of said limit switches being adjustably mounted on said base; and means movable in accordance with said movable member and adapted to selectively engage the operating member of said limit switches.

8. Means for controlling various functions of a machine having a movable member, comprising: a plurality of controls positioned in lateral relation; operating means movable in a direction transverse to the lateral disposition of said controls and being engageable therewith to effect operation thereof, said controls being adjustable in the line of movement of said operating means to effect adjustment of selective interengagement; and fluid-drive means establishing connection between said member and said operating means, for moving said operating means in accordance with the movement of said member.

9. Means for controlling various functions of a machine having a movable member, comprising: a support, a base adjustable on said support; a plurality of electrical limit switches adapted to be placed in circuit with means for controlling said functions, each of said switches being mounted in laterally spaced-apart relation on said base and at least certain of said switches being adjustable on said base in a direction transverse to such lateral spacing, and said base being adjustable in the same direction, all of said switches having operating members extending in a direction away from said base; a first fluid cylinder fixed with respect to said movable member and having its piston movable with said movable member, and a second fluid cylinder fixed with respect to said support and having its piston movable relative to said support and in a direction transverse to the lateral spacing of said switches, said first and second cylinders being connected in a fluid circuit so that the pistons in both fluid cylinders are movable in accordance with the movement of said movable member, whereby said control means may be disposed at a point remote from said machine; an operating arm connected to the piston of said second cylinder and spanning the distance between the operating members of the outermost switches, said operating arm being engageable with said operating members to effect operation of said switches.

10. In a flash welder having a platen movable in a welding direction and return, a plurality of controls for respectively determining current cut-off, amount of up-set, forward stop of the platen in a welding direction, and rearward stop of the platen in a return direction; operating means movable to selectively engage and operate said controls; and means for moving said operating means in unison with the movement of said platen.

11. In a flash welder having a platen movable in a welding direction and return, a plurality of electrical limit switches for controlling current cut-off, amount of up-set, forward stop of the platen in welding direction, and rearward stop of the platen in a return direction; operating means movable to selectively engage said limit switches to control the welding operation; and fluid-drive means establishing connection between said operating means and said platen, for moving said operating means in accordance with the movement of said platen.

12. For use with a flash welder having a movable platen, control means, comprising: an adjustable base; a plurality of electrical limit switches carried by said base, at least certain being adjustable in the same direction as the adjustment of said base, said limit switches being adapted to control various functions of said welding machine; operating means movable generally in the same direction as the adjustment of said base, and adapted to selectively engage and operate said limit switches; and means for moving said operating means in accordance with the movement of said platen.

13. For use with a flash welder having a movable platen, control means, comprising: a plurality of controls for controlling various functions of said welder; a first fluid cylinder fixed with respect to said welder and having its piston movable with said platen, and a second fluid cylinder fixed with respect to said control means and having its piston movable relative to said control means and including actuating means adapted to selectively operate said controls, said first and second cylinders being connected in a fluid circuit so that the pistons in both fluid cylinders are movable in accordance, whereby said control means may be disposed at a point remote from said machine.

KINGSLEY A. DOUTT.

REFERENCES CITED

The following references are of record in the file of this patent:

UNITED STATES PATENTS

| Number | Name | Date |
|---|---|---|
| 1,931,255 | Frantz | Oct. 17, 1933 |
| 2,079,124 | Lockett | May 4, 1937 |
| 2,187,452 | Gordon et al. | Jan. 16, 1940 |
| 2,359,324 | Marcaux | Oct. 3, 1944 |
| 2,373,226 | Coates | Apr. 10, 1945 |
| 2,404,620 | Cooper | July 23, 1946 |

FOREIGN PATENTS

| Number | Country | Date |
|---|---|---|
| 9,890 | Great Britain | Apr. 22, 1910 |
| 280,659 | Great Britain | Nov. 24, 1927 |
| 507,541 | Great Britain | June 16, 1939 |